US 8,208,484 B2

(12) United States Patent
Brunner et al.

(10) Patent No.: US 8,208,484 B2
(45) Date of Patent: Jun. 26, 2012

(54) FORWARDING A PACKET WITHIN A ROUTER USING FRAGMENTS OVER AN INTERCONNECT

(75) Inventors: Robert Brunner, Montreal (CA); Laurent Marchand, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 214 days.

(21) Appl. No.: 12/726,216

(22) Filed: Mar. 17, 2010

(65) Prior Publication Data

US 2011/0170540 A1     Jul. 14, 2011

Related U.S. Application Data

(60) Provisional application No. 61/293,882, filed on Jan. 11, 2010.

(51) Int. Cl.
*H04L 12/28* (2006.01)
*H04L 12/56* (2006.01)

(52) U.S. Cl. .......................... 370/419; 370/392

(58) Field of Classification Search .................. 370/389, 370/392, 419
See application file for complete search history.

(56) References Cited

U.S. PATENT DOCUMENTS

| | | |
|---|---|---|
| 6,965,603 B1 | 11/2005 | Parruck et al. |
| 7,480,303 B1 * | 1/2009 | Ngai .................... 370/395.5 |
| 2003/0169699 A1 * | 9/2003 | Haardt .................... 370/316 |
| 2005/0174940 A1 * | 8/2005 | Iny ........................ 370/232 |
| 2006/0023719 A1 | 2/2006 | Sindhu et al. |
| 2006/0187907 A1 | 8/2006 | Kinsman et al. |
| 2008/0205287 A1 * | 8/2008 | Kuhl et al. ............... 370/252 |
| 2009/0116490 A1 | 5/2009 | Charpentier et al. |
| 2009/0213869 A1 * | 8/2009 | Rajendran et al. ............ 370/420 |

OTHER PUBLICATIONS

PCT Search Report from corresponding application PCT/IB2011/050101.
Norbert Venet et al., Multi-Gigabit Optical Interconnects for Next-Generation On-Board Digital Equipment, Proceedings of the 3rd International Conference on Space Optics (ICSO 2004), Mar. 30-Apr. 2, 2004, pp. 581-587.

* cited by examiner

*Primary Examiner* — Ronald Abelson (74) *Attorney, Agent, or Firm* — Jean-Pierre Fortin; Ericsson Canada Inc.

(57) ABSTRACT

A method and a router having a plurality of blades comprising at least a first blade and a second blade. The router comprises an interconnect providing a plurality of channels, each of which being used between two of the blades. The first blade receives a packet addressed to exit the router via the second blade, segments the packets into at least two fragments and forwards each fragment to at least two different blades, each via one of the interconnect's channels. The interconnect may be an optical interconnect by which a single wavelength from one blade defines one of the plurality of channels and wherein each blade supports a plurality of wavelengths. The at least two different blades may comprise each blade of the router, except the first blade. Each of the plurality of channels may also be a dedicated channel between two of the blades.

5 Claims, 9 Drawing Sheets

Fig. 5e ional patent application
FORWARDING A PACKET WITHIN A ROUTER USING FRAGMENTS OVER AN INTERCONNECT

PRIORITY STATEMENT UNDER 35 U.S.C S.119 (e) & 37 C.F.R. S.1.78

This non-provisional patent application claims priority based upon the prior U.S. provisional patent application entitled "SCALABLE FABRIC BY DISTRIBUTED FRAGMENT FORWARDING (DFF) VIA AN OPTICAL MESH", application No. 61/293,882, filed Jan. 11, 2010, in the names of Laurent Marchand and Robert Brunner

TECHNICAL FIELD

The present invention relates to routers and more particularly to inter-module packet exchange architectures.

BACKGROUND

Typical routers use a switch fabric to exchange packets between blades. As the number of blades increases in typical routers, the capacity of the switch fabric needs to increase as well. However, the capacity of switch fabric is inevitably limited. A scalability problem thus arises in typical routers as the number of blades increases. Examples of undesired consequences related to the scalability problem include, among others, energy consumption and heat dissipation. The present invention addresses at least some of the foregoing shortcomings related to typical routers.

SUMMARY

A first aspect of the present invention is directed to a router having a plurality of blades comprising at least a first blade and a second blade. The router comprises an interconnect providing a plurality of channels. Each of the plurality of channels is used between two of the plurality of blades. The first blade receives a packet addressed to exit the router via the second blade, segments the packets into at least two fragments and forwards the at least two fragments to at least two different blades of the plurality of blades, each fragment being forwarded via one of the interconnect's channels.

Optionally, the at least two different blades may not comprise the second blade. In such a case, each of the at least two different blades further forwards each of the at least two fragments to the second blade via the interconnect. Likewise, in the same optional case, the interconnect may further carry each of the at least two fragments from the at least two different blades to the second blade.

Another option is that the at least two different blades comprise the second blade. In this other exemplary case, the first blade forwards a first fragment of the at least two fragments directly to the second blade via the interconnect and forwards each other of the at least two fragments to the at least two different blades, except the second blade, via the interconnect. The interconnect may then further carry each other of the at least two fragments from the at least two different blades, except the second blade, to the second blade. Still in the example where he second blade is one of the at least two different blades, the second blade may receive a first of the at least two fragments from the first blade via the interconnect and receives each other of the at least two fragments from the other at least two different blades via the interconnect.

The interconnect may optionally be an optical interconnect by which a single wavelength from a single of the plurality of blades defines one of the plurality of channels and wherein each blade supports a plurality of wavelengths.

The at least two different blades may also optionally comprise each of the plurality of blades of the router, except the first blade.

Each of the plurality of channels may also be a dedicated channel between two of the plurality of blades.

The packet may optionally be received on one of a plurality of ports of the first blade and be addressed to exit the router on one of a plurality of ports of the second blade.

A second aspect of the present invention is directed to a method of forwarding a packet from a first blade to a second blade of a router comprising a plurality of blades and an interconnect by which each of the plurality of blades can reach each other of the plurality of blades using a channel. The method comprises the steps of receiving a packet at the first blade, the packet being addressed to exit the router via the second blade, fragmenting the packet into at least two fragments at the first blade and forwarding the at least two fragments from the first blade to at least two different blades of the plurality of blades, each of the at least two fragments being forwarded via one of the interconnect's channels.

Optionally, the method may further comprise steps of carrying by the interconnect each of the at least two fragments from the first blade to the different blades, forwarding, from each of the at least two different blades, each of the at least two fragments from the different blades to the second blade and carrying by the interconnect each of the at least two fragments from the at least two different blades to the second blade.

The method may also optionally comprise steps of carrying by the interconnect each of the at least two fragments from the first blade to the at least two different blades, wherein one the at least two different blades is the second blade, forwarding, from each of the at least two different blades except the second blade, each other of the at least two fragments to the second blade and carrying by the interconnect each other of the at least two fragments, from the at least two different blades except the second blade, to the second blade.

The method may further optionally comprise steps of receiving by the second blade a first of the at least two fragments from the first blade via the interconnect and receiving by the second blade each other of the at least two fragments from the other at least two different blades via the interconnect.

BRIEF DESCRIPTION OF THE DRAWINGS

For a more detailed understanding of the invention, reference can now be made to the following description, taken in conjunction with the accompanying drawings, in which.

DETAILED DESCRIPTION

The present invention enhances scaling of an N blade router system, by replacing a traditional switch fabric with a distributed Fragment Forwarding Engine (FFE). The backplane can also optionally be replaced with a passive photonic Arrayed Waveguide Grating Router (AWGr). A blade receiving a packet segments the packet into fragments, whereby all fragments targeted for a destination blade are "distributed" to every "active" neighboring blade in the system. A blade which receives an unintended fragment, "bounces" (forwards) the fragment directly to the intended target blade.

In an N-blade system, a blade sends fragments to N−1 neighboring blades by concurrently transmitting on N−1 channels (e.g., wavelengths) over a single support (e.g., strand of optical fiber). When an optical backplane is used, the AWGr will refract the N−1 channels of light across N−1 output ports, reaching N-1 receiving blades.

The AWGr therefore enables a service that is analogous to a full-mesh (path to every neighbor) backplane by having a single channel (wavelength) of light serving as a direct pseudo-wire connection between a pair of blades in the system.

Exemplary implementations include a standalone ASIC, ASSP, or FPGA, or integrated as an adjunct function to existing silicon (e.g., Network Processor (NP)).

Reference is now made to the drawings in which several optional aspects in relation to the present invention are drawn using dotted lines. Persons skilled in the art will readily recognize that some functions or structures, while needed for the proper functioning of the traditional routers, do not affect the present invention. The same reference numeral refers to the same or similar element throughout the different drawings. Drawings may present logical views of physical elements and are not drawn to scale.

Figure 1:
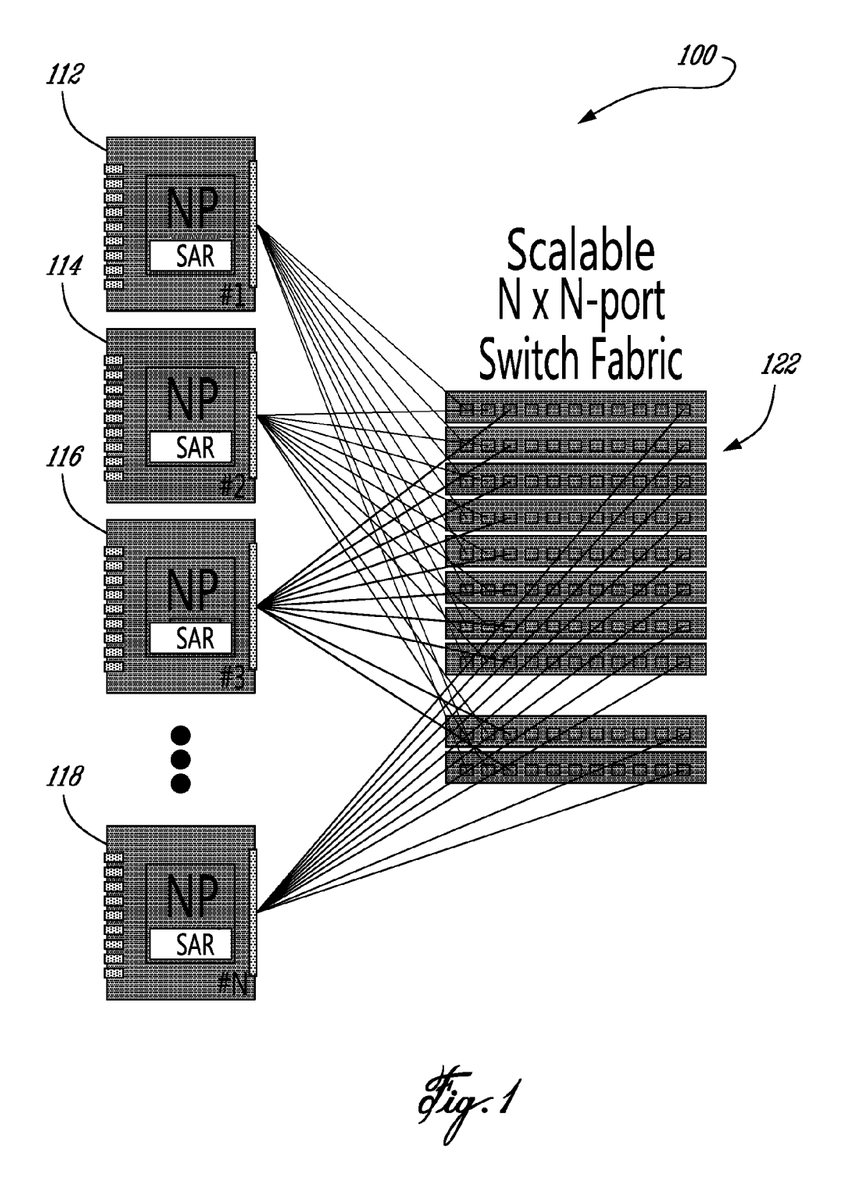
FIG. 1 is an exemplary modular representation of a router in accordance with the teachings of the present invention.

FIG. 1 shows modular representation of a router 100 in accordance with some aspects of the present invention. The router 100 comprises N blades (112, 114, 116, 118), each of which fragments (or segments) a packet and distributes the fragments by tunneling them across N switches (e.g. Ethernet, ATM, SPAUI, etc). The N switches represent a "centric" switch fabric 122, whereby each "switch" has a dedicated port to every blade in the router 100. Effectively, each blade in the router 100 has N connections to N ports of the switch fabric 122. The switch fabric 122 forwards the "fragments" of a packet to a destination blade, whereby the receiving blade "aggregates" the fragments and then "reassembles" them "in order" into a packet. The process of packet segmentation, aggregation of fragments, and reassembly back into the original sent packet is carried out by circuitry called a "SAR", which stands for Segmentation, Aggregation, & Reassembly Circuit. With the router 100, the switch fabric 122 size would grow geometrically (N^2) with the number of blades (N) in the router 100.

Figure 2:
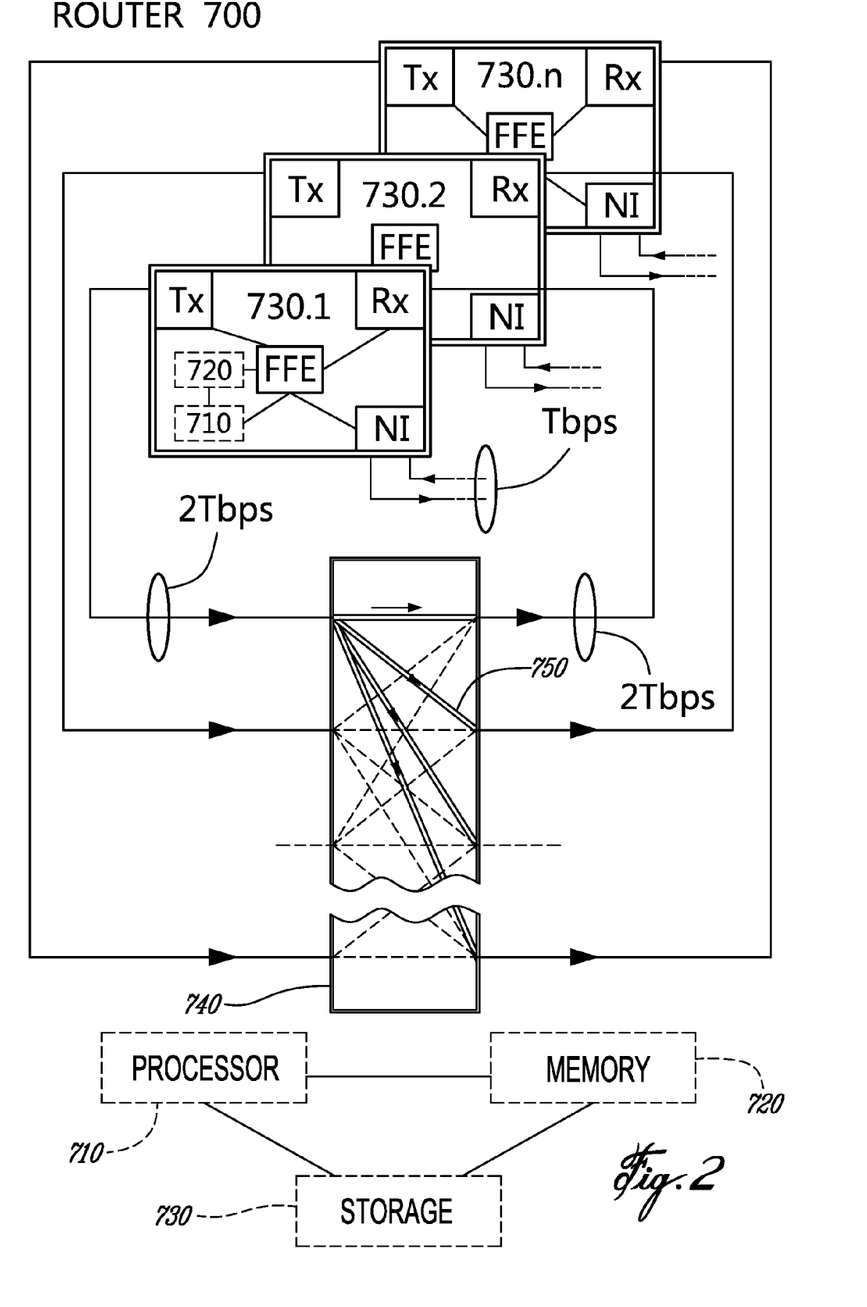
FIG. 2 is another exemplary modular representation of a router in accordance with the teachings of the present invention.

FIG. 2 shows another exemplary modular representation of a router 700 in accordance with the teachings of the present invention. The router 700 comprises a plurality of blades 730.1 . . . 730.n whereby 730.1 refers to a first blade and an interconnect 740 by which each of the plurality of blades can reach each other via channels of the interconnect 740. The router 700 may optionally comprise a processor module 710, a memory module 720 and a storage module 730. The processor module 710 can be distributed on different modules of the router 700 or can stand alone as a separate module 710 in the router 700. Likewise, the processor module 710 may represent a single processor with one or more processor cores or an array of processors, each comprising one or more processor cores. Similarly, the memory module 720 may comprise various types of memory (different standardized or kinds of Random Access Memory (RAM) modules, memory cards, Read-Only Memory (ROM) modules, programmable ROM, etc.). The memory modules 720 can further be distributed on different modules of the routers 700 or be a separate module. The storage module 730 may represent one or more logical or physical as well as local or remote hard disk drive (HDD) (or an array thereof). The storage module 730 may further represent a local or remote database made accessible to the router 700 or any or its module by a standardized or proprietary interface.

As shown on FIG. 2, the exemplary first blade 730.1 comprises a transmission (TX) module, a Reception (RX) module, a Fragment & Forward Engine (FFE) module and a network interface (NI) module. The NI module comprises one or more physical ports towards other network nodes (router, switches, computers, etc.). It should be understood that it is not necessary for all blades 730.1 . . . 730.n of the router 700 to support the teachings of the present invention to provide for the proper function of the router 700. The present invention could be implemented on a subset of the blades 730.1 . . . 730.n. However, the potential of the present invention is best obtained when all blades 730.1 . . . 730.n are provided with modules in accordance with the teachings of the present invention.

In the following example, the interconnect 740 will be represented as a full-mesh backplane that permits all blade to blade connectivity. Even though a partial mesh backplane representation could provide some of the functionalities of the present invention, the wider potential of the invention is obtained by using a full mesh backplane representation. Exemplary technologies for connectivity may be in the form of any of the below combinations:

a copper backplane, ZD connectors & high speed SerDes;
polymer substrate backplane, ribbon-fiber, optical fiber (SMF, MMF), with DWDM or grey light that is modulated (OFDM) or polarized (TE, TM), or sent as bursts (TDMA); or
optical fiber, AWGr, with DWDM transceivers.

For the purpose of the present description, the exemplary full-mesh backplane of the interconnect 740 will be represented as an optical interconnect by which a single wavelength from a single of the plurality of blades 730.1 . . . 730.N defines one channel to one other blade. Each blade of the router 700 supports a plurality of wavelengths in such an exemplary implementation. Each of the plurality of channels provided by the interconnect 740 may be dedicated channels between two of the plurality of blades.

The RX and TX modules of each blade may be implemented, for instance, by a small Photonic Integrated Circuit (PIC) module that permits DWDM light to be transmitted/received over a "single" optical fiber. The interconnect 740 implemented as a AWGr has the effect of refracting ingress light by varying degrees towards an egress port thereby defining channels in the interconnect 740 (e.g., channel 750). With respect to the AWGr's source port (e.g., used by a single blade of the router 700) light is refracted, for instance, as follows: blue light by +0 degrees, green light by +1 degree, yellow light by +2 degrees and red light by +3 degrees. It shall be readily understood that the light "coloring" and number of degrees given herein are used for illustration purposes only. An actual system would use different wavelengths that each refract sufficiently distinctly from each other to be distinguished by a captor or egress port built for this purpose.

As shown on FIG. 2, the interconnect 740 can be dimensioned in view of the number (N) of blades in the router 700. Still, it is possible to obtain a high density of channels while ensuring that light can concurrently pass through the AWGr, without any contention issues. Each channel such as channel 750 is representative of a connection between 2 blades. In effect, the plurality of channels of light propagated by the AWGr is topologically equivalent to a full-mesh. For typical routing applications the loopback channel (blue light) to "self" is not used.

To increase channel capacity (between a pair of blades), closely spaced wavelengths of light (e.g. multiple shades of blue light) could be utilized without impacting the routing behavior of the AWGr. In the context of the present invention, an aggregate backplane capacity per blade provides twice the media-side capacity. This is to accommodate a worst-case traffic scenario which is described in detail further below.

The example shown on FIG. 2 will continue with an exemplary media-side capacity of T bps supported by the router 700. The media-side capacity corresponds to the blades' network interfaces capacity. The upper bound capacity per blade would then have to be "2T" for each connection between each blade and the interconnect 740. In fact, 1T of capacity needs to be attributed to "itself" (e.g., sourced by the media-side) and 1T of capacity needs to be available for the Fragment and Forward Engine (FFE) "bouncing" fragments to neighboring blades in the router 700 as will be made more apparent with reference to the following description. The channel (e.g., per wavelength) capacity requirement would then be 2T/(N−1) for the exemplary N-blade router 700. It is interesting to note that, as N increased in the router 700, the actual channel capacity requirement diminishes. For minimal system latency, higher speed Physical Layer chips (PHYs) may be used to drive the lowered capacity channels in a "bursty" fashion.

The interconnect 740 of the router 700 therefore provides a plurality of channels (e.g., 750), wherein each of the plurality of channels is used between two of the plurality of blades. In the example of FIG. 2, the first blade 730.1 receives a packet addressed to exit the router via the second blade 730.2. The first blade 730.1 segments the packets into a plurality of fragments and forwards each of the fragments to a different blade of the plurality of blades 730.2 ... 730.n. Each fragment is forwarded via one of the interconnect's 740 channels (e.g., 750).

There are two optional possibilities concerning the forward from the first blade 730.1: either the different blades to which it forwards the fragments comprise the second blade 730.2 or the different blades do not comprise the second blade 730.2. If the different blades do not comprise the second blade 730.2, each of the different blades further forwards each of the plurality of fragments to the second blade 730.2 via the interconnect 740. The interconnect 740 further carries each of the plurality of fragments from the different blades to the second blade 730.2.

If the different blades comprise the second blade 730.2, it means that the first blade 730.1 forwards a first fragment of the plurality of fragments directly to the second blade 730.2 via the interconnect 740. Consequently, the first blade 730.1 forwards each other of the plurality of fragments to the different blades, except the second blade 730.2, via the interconnect 740. The interconnect 740 further carries each other of the plurality of fragments from the different blades, except the second blade 730.2, to the second blade 730.2.

The second blade 730.2 may therefore receive a first of the plurality of fragments from the first blade 730.1 via the interconnect 740 and receive each other of the plurality of fragments from the different blades via the interconnect 740.

The first blade 730.1 may optionally forward the plurality of fragments to all the blades 730.2 ... 730.n of the router 700 (i.e., except itself) or may optionally forward the plurality of fragments to only a subset of the plurality of blades 730.2 ... 730.n.

The packet may further be more particularly received on one of a plurality of ports (not shown) of the first blade 730.1 and be addressed to exit the router 700 on one of a plurality of ports (not shown) of the second blade 730.2.

Figure 3:
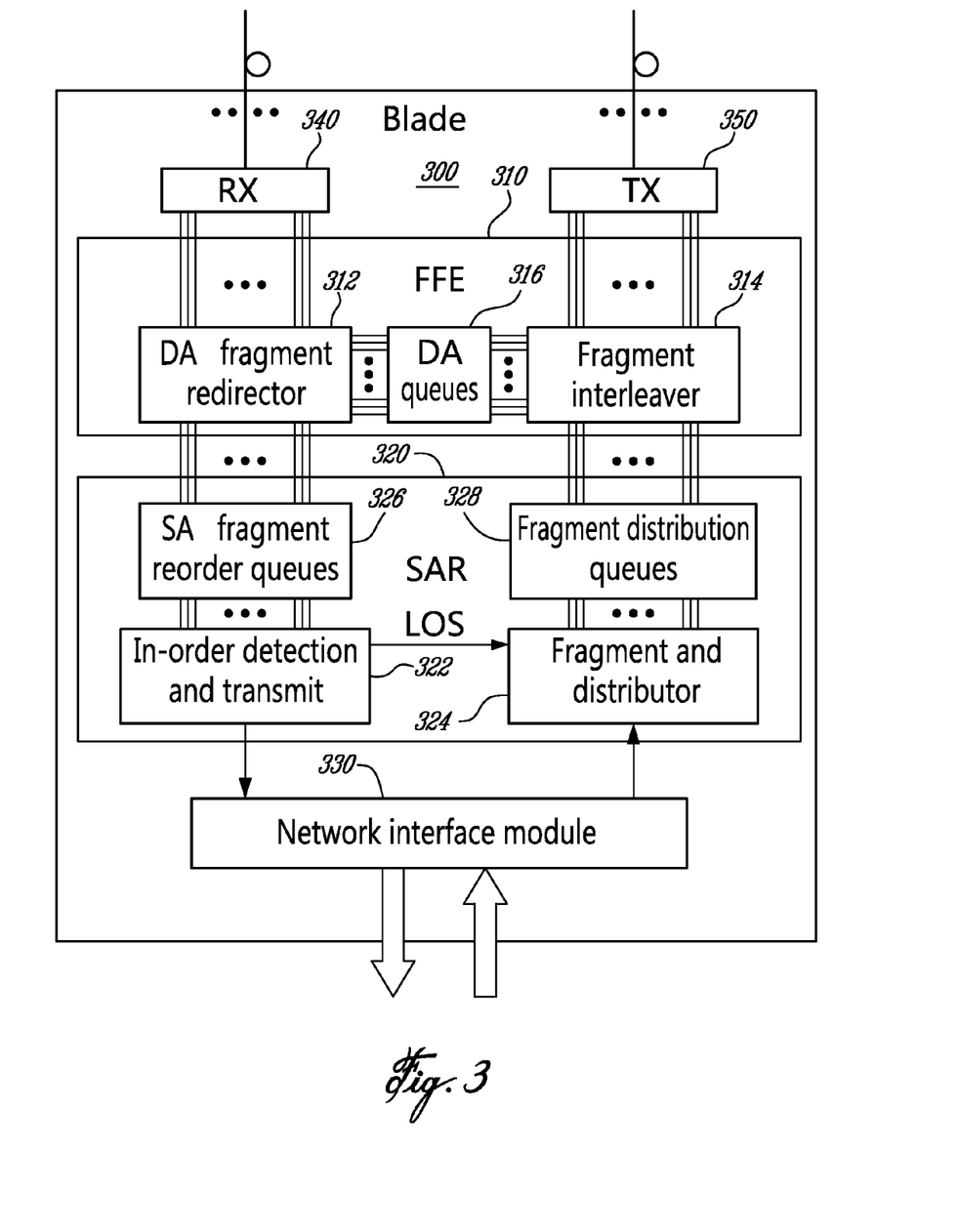
FIG. 3 is an exemplary modular representation of a blade in accordance with the teachings of the present invention.
Figure 4A:
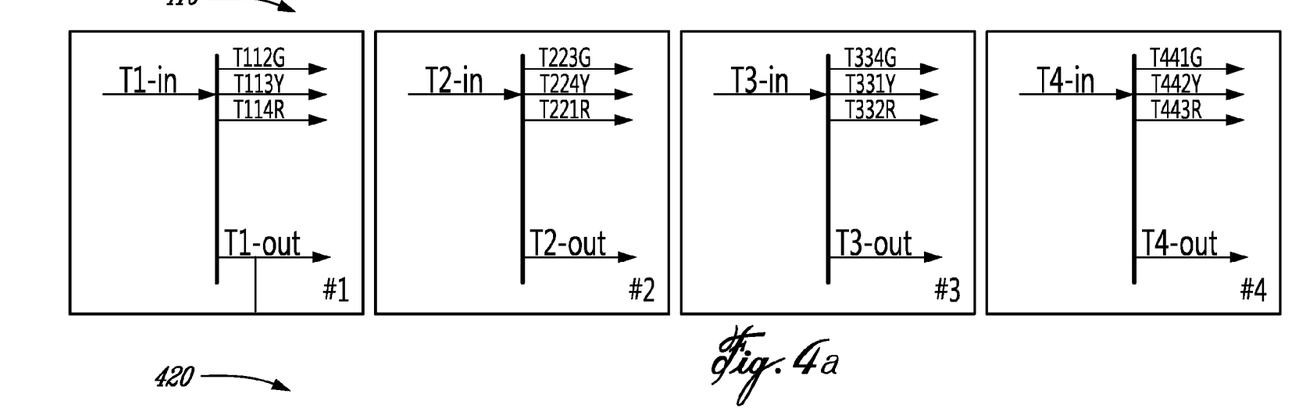
FIGS. 4 and 5 are two flow charts illustrating a series of steps in exemplary packet transmission scenarios in accordance with the teachings of the present invention.
Figure 4B:
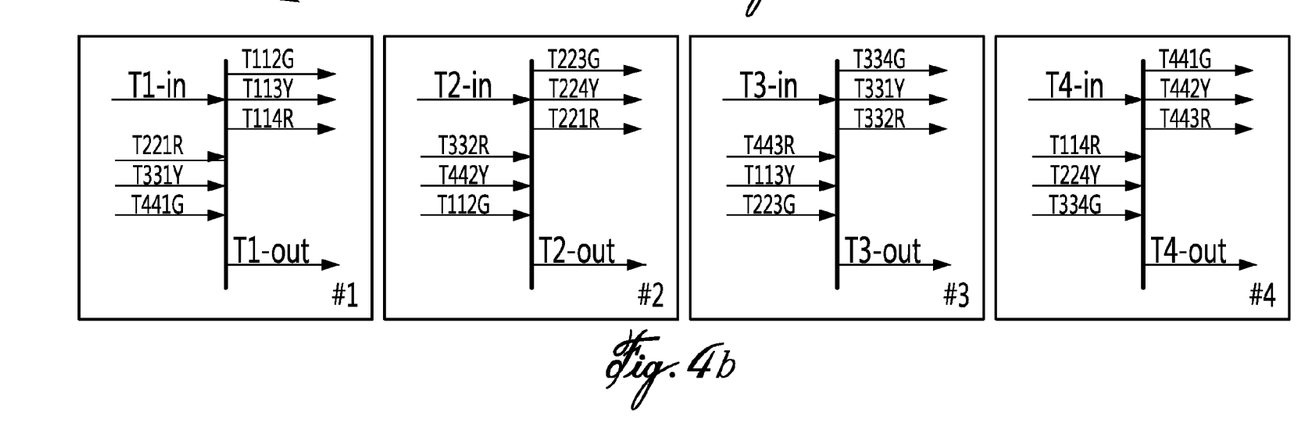
Figure 4C:
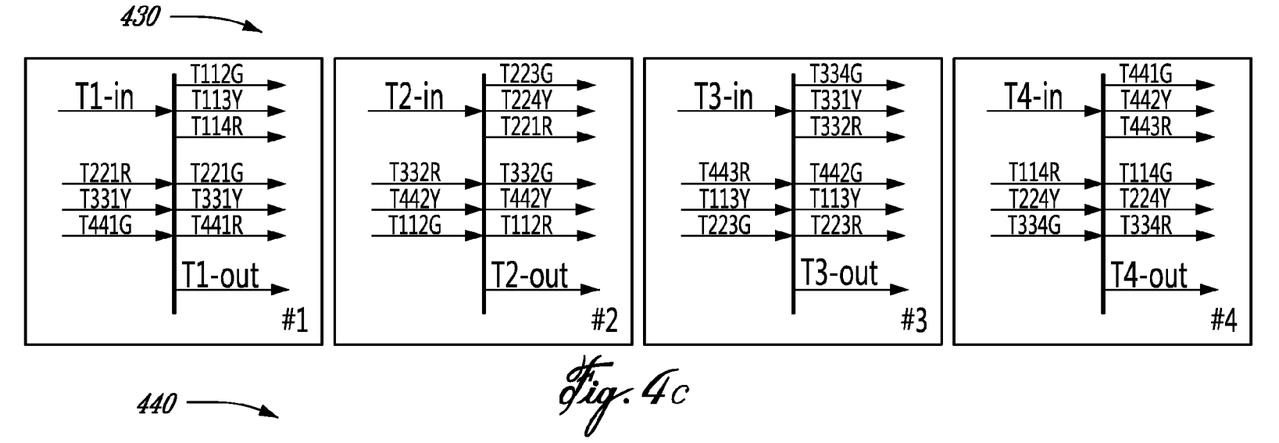
Figure 4D:
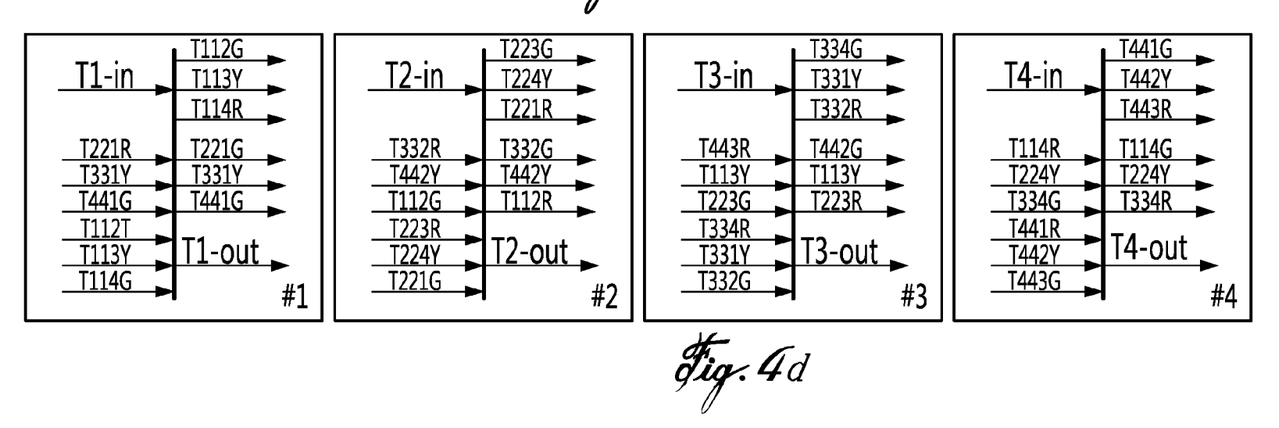
Figure 5A:
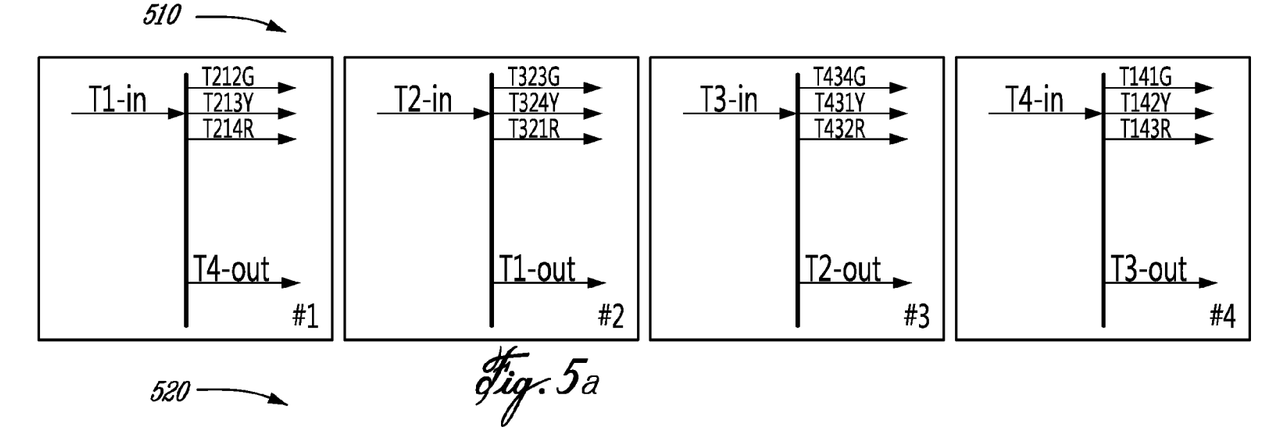
Figure 5B:
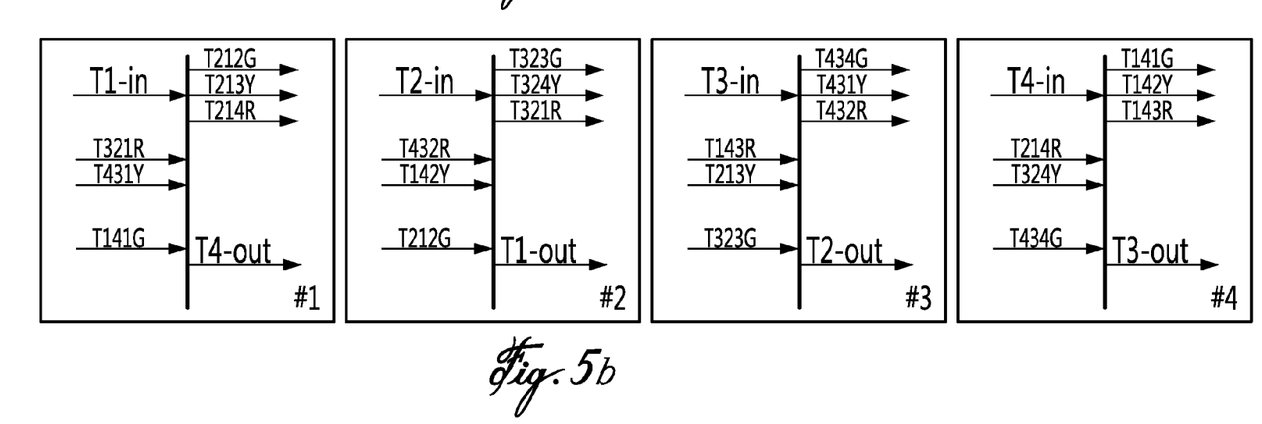
Figure 5C:
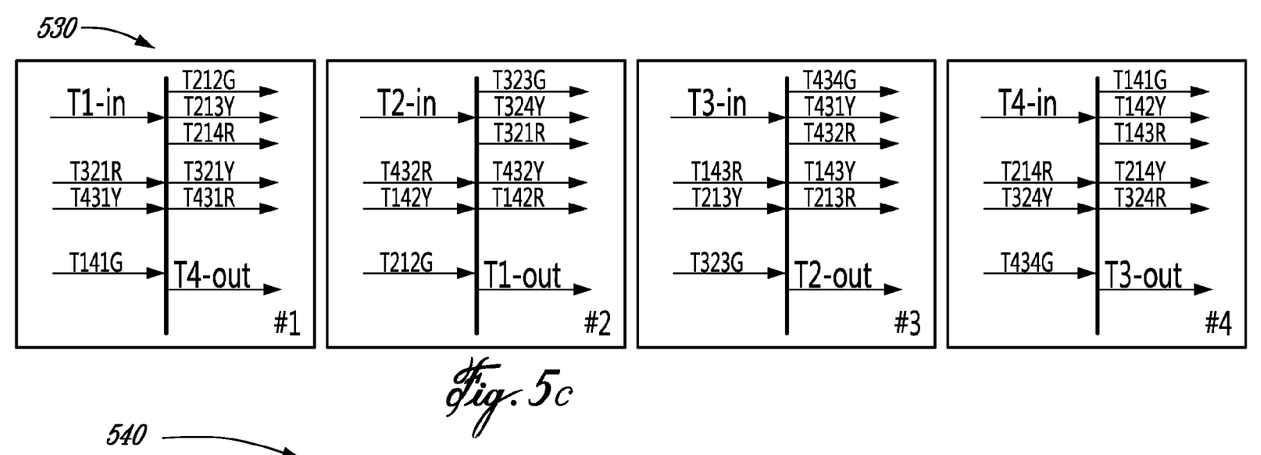
Figure 5D:
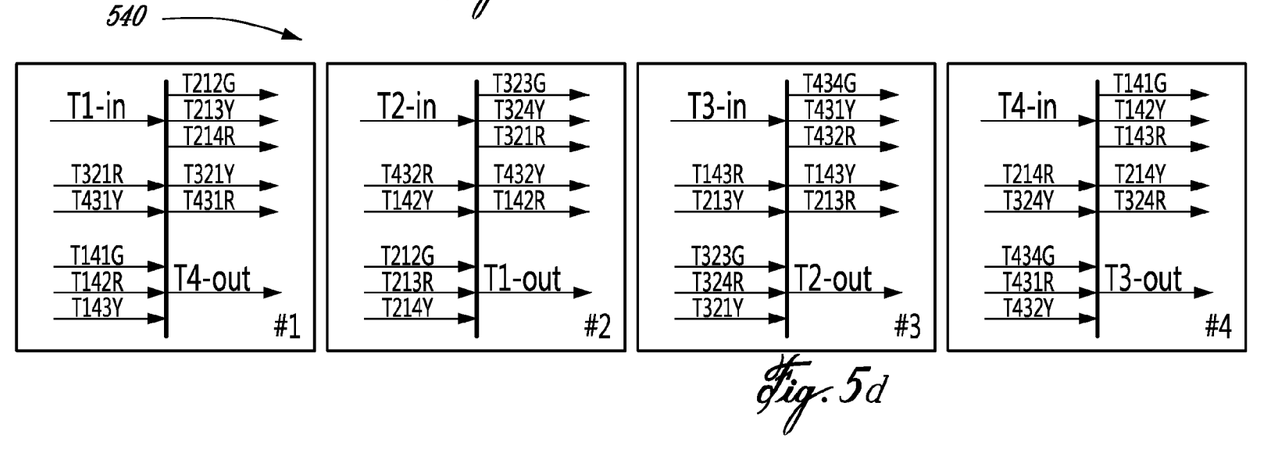
Figure 5E:
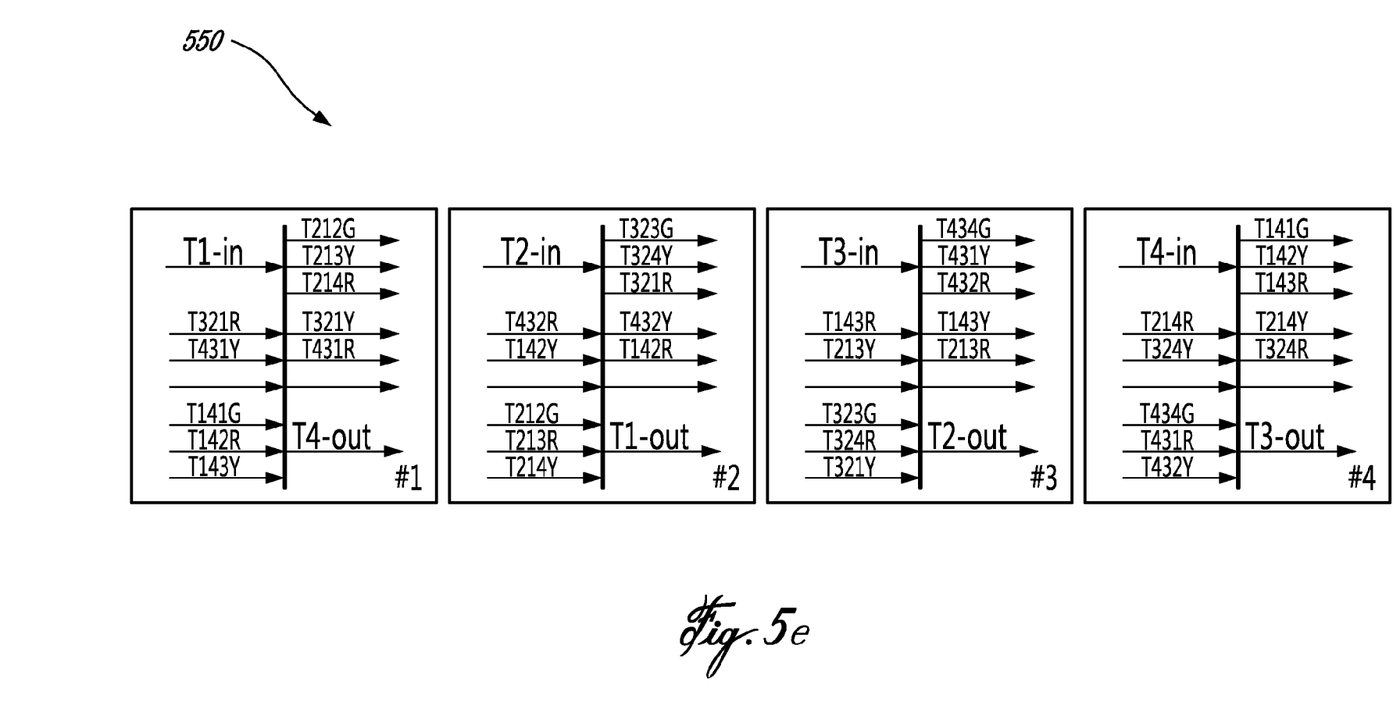

The format of a fragment, for instance as exchanged on the interconnect 740, may comprise the following fields, which permits the addressing of an exemplary 64 blade router:

SOP—Start of Packet Indicator bit
EOP—End of Packet Indicator bit
DA—Destination Address (6-bits)
Flow Indicator 1—SA Queue State (Satisfied/Hungry/Starving)
SA—Source Address (6-bits)
Flow Indicator 2—TA Queue State (2-bits)
TA—Transit Address (Indirect Path)
SN—Sequence Number
Payload Fragment (Fixed or Variable Length)
BIP/CRC—Bit Interleaved Parity or Checksum FIG. 3 shows an exemplary modular representation of a blade 300 in accordance with the teachings of the present invention. The exemplary blade 300 of FIG. 3 comprises a FFE module 310 and SAR module 320. The SAR module 320 comprises a In-Order Detection and Transmit module 322, a Fragment & Distributor module 324, a SA Fragment Reorder Queues module 329 and a Fragment Distribution Queues module 328. The FFE module 310 comprises a DA Fragment Redirector module 312, a Fragment Interleaver module 314 and a DA Queues module 316. FIG. 3 illustrates an exemplary interworking of the FFE module 310 and the SAR module 320 in accordance with the present invention. The blade further shows a network interface module 330, which is used to interact with other network nodes. The network interface module 330 could also be located on one or multiple other modules of the blade's 300 router.

The network interface module 330 may receive a packet (e.g., using a traffic manager (TM)) that needs to be carried through a backplane or interconnect towards another blade. The network interface module 330 therefore sends the packet towards the backplane after having determined what is the target blade, for instance using, different tables of the blade 300 (not shown) or the blade's 300 router.

SAR TX Stage: Fragment & Distributor module 324

The packet is received from the network interface module 330 by the Fragment-Distributor module 324. The packet is segmented into fragments, and each fragment is encapsulated, for instance, into the frame format as exemplified hereinabove. Person skilled in the art will readily recognize that other formats could be used in accordance with the teachings of the present invention.

The flow indicator #1 field, is populated with the state of the "SA Fragment Queue (#DA)", while flow indicator #2 is populated with the state of the "Bounced Fragment Queue (#DA)". The TA field is populated with a transit blade identifier (e.g., blade number) which will transit the fragment, while the SN field can be used as a serial sequence to facilitate in the reassembly of the fragments by the addressed target blade.

The algorithm for allocating TA's can be a simple round robin scheme, which is used in the traffic scenarios described hereinbelow. A weighted distribution scheme that may also be employed is described as an optional aspect. The weighted distribution scheme allocates more fragments to 0 hop paths (i.e. DA=TA) and reduces the quantity of bounced fragments in a system.

All fragments with the same TA are directed to the Fragment Distribution Queue module 328, which are to be transmitted to blade #TA via a dedicated channel (e.g., wavelength).

FFE TX Stage: Fragment Interleaver module 314

The Fragment Interleaver module 314 multiplexes fragments that are targeted for the same blade between the DA Queues module 316 that contains bounced fragments (as will be more readily apparent later on) and Fragment Distribution Queues module 328 using, for instance, a 50-50 duty cycle. The multiplexed fragments are thereafter sent towards the TX module 350, which forwards them via a dedicated channel of the backplane.

FFE RX Stage: DA Fragment Redirector module 312

The DA Fragment Redirector module 312 receives fragments from the backplane via the RX module 340. Those fragments which DA is addressed to "self" are directed to the SA Fragment Reorder Queues module 326.

Fragments whose DA is addressed not to "self" are redirected to the DA Queues (or Bounced Fragments) module 316, which are then queued based on a common DA.

SAR RX Stage: SA Fragment Reorder Queues module 326

The SA Fragment Reorder Queues module 326 sorts fragments addressed to "self" based on the SA. The SN may be used to sequence the fragments "in order".

SAR TX Stage: In-Order Detection & Transmit module 322

The fragments in the SA Fragment Reorder Queues module 326 will eventually happen to be delimited by an SOP & EOP indicator. This indicates that the SA Fragment Reorder Queues module 326 comprises a packet that can be tagged as "ready" for transmission. The In-Order Detection & Transmit module 322 can then empty the corresponding queues from the SA Fragment Reorder Queues module 326 using, for instance, a "round robin" procedure.

In the event of a Loss of Signal (LOS) or break in connection to a neighboring blade detected by the Fragment and Distributor module 324, a scheduler, for instance in the Fragment Interleaver 314 or the In-Order Detection and Transmit module 322, may skip sending fragments and/or packets to the DA/TA bound blade.

The memory resources of the SA Fragment Reorder Queues module 326 may experience "congestion" at the destination DA. To avoid losing data at the destination DA, a message may thus be returned to the sender to "rate limit" the source SA, specifically for data flows towards the destination DA.

Congestion management may be activated, which may involve suggest, for instance, exchanging states of receiving queues in reverse direction traffic. This could be done, for instance, by continually exchanging "SA Queue State" bits (not shown) between the In-order Detection and Transmit module 322 and the Fragment and Distributor module 324. Examples of different states exchanged include: starving (underflow condition), hungry (normal condition), and satisfied (approaching overflow condition). A credit based methodology may also optionally be used to tally the severity of a state (e.g. if 100 SATISFIED messages are received from the source SA in succession, it can be concluded that "loss" is eminent if no action is taken). If no reverse direction traffic is available, as in the case of unidirectional traffic, then the destination DA may intermittently send a plain "header" without any payload towards the source SA to trigger the state exchange.

In the example of FIG. 3, the blade 300 does not explicitly show memory modules or hardware structures. Persons skilled in the art will readily recognize that the various queues modules (e.g., 312, 314, 316, 326, and 328) of FIG. 3 comprise an underlying modification of some memory content to at least temporarily store fragments and/or packets.

FIG. 4 shows a flow chart illustrating a series of steps in an exemplary packet transmission scenario in accordance with the teachings of the present invention. In the simple example of FIG. 4, the traffic distribution is such that all packets received by a blade, are routed to the same blade. In other words, the packet "T1-in" which is received by blade #1, is forwarded into the backplane, addressed to self, received/reassembled and transmitted as "T1-out" by blade #1. Similarly, the same traffic distribution applies to the other blades in the system.

The notation used to identity packet "fragments", is "Tabcd", where the letter "a" represents the "destination blade", "b" the "source blade", "c" the "transit blade", and "d" the wavelength (color) used, within which "G" is green, "Y" is yellow and "R" is red.

In step 410, the incoming packet T1-in is fragmented by blade #1 into fragments T112G, T113Y, & T114R. The "destination" of the fragments is to "self", which are distributed to neighboring blades (#2, #3, #4), using colored light (G, Y, R respectively). Likewise, incomings packets into the other blades (#2, #3, #4) are fragmented and distributed to their respective neighboring blades.

In step 420, the beams of light injected into the AWGr in step 410 emerge. Blade #1 receives 3 fragments from each of its neighboring blades, which are not addressed to "self". A similar pattern of fragments is received by the other blades (#2, #3, 4).

Blade #1 queues the fragments T221R, T331Y, & T441G, into their respective "DA Queues" (Bounced Fragments). Likewise, the other blades (#2, #3, #4) queue their respective bounced fragments.

In step 430, the fragments T221R, T331Y, & T441G, are retagged to T221G, T331Y, & T441R, to reflect the transmission wavelengths used by blade #1. Similarly, retagging occurs for the transiting fragments in the other blades (#2, #3, #4).

The blade #1 "Inter-leaver" multiplexes fragments T221G with T112G, T331Y with T113Y, and T441R with T114R, which share the same link (wavelength channel) to blades #2, #3, & #4 respectively.

In step 440, the bounced fragments injected into the AWGr in step 430 emerge. Blade #1 receives 3 fragments, T112T, T113Y, & T114G, from each of its neighboring blades, which are addressed to self.

The "DA Fragment Redirector" forwards the fragments into the "SA Fragment Reorder Queue (#1)". The "In Order Detection" stage upon detecting an "assembled" packet from SA #1, schedules the transmission of packet T1-out. For this exemplary traffic scenario, the backplane capacity required is 2T per blade, which is a "worst case" scenario.

FIG. 5 shows a second flow chart illustrating a series of steps in another exemplary packet transmission scenario in accordance with the teachings of the present invention. In the following exemplary packet transmission scenario, the traffic distribution is such that all packets received by a blade, are routed to an adjacent blade. In other words, packet "T1-in" which is received by blade #1, is forwarded into the backplane, addressed to the "next" blade, received/reassembled and transmitted as "T1-out" by blade #2. Similarly, the same traffic distribution applies to the other blades in the system.

In step 510, the incoming packet T1-in is fragmented by blade #1, into fragments T212G, T213Y, & T214R. The destination of the fragments are to the "next" blade, which are distributed to neighboring blades (#2, #3, #4), using colored light (G, Y, R respectively). Likewise, incomings packets into the other blades (#2, #3, #4) are fragmented and distributed to their respective neighboring blades.

In step 520, the beams of light injected into the AWGr in step 510 emerge. Blade #1 receives 3 fragments from each of its neighboring blades. Two of the received fragments are addressed to neighboring blades, while the 3rd fragment is addressed to "self". A similar pattern of fragments are received by the other blades (#2, #3, #4).

Blade #1 queues the fragments T321R, & T431Y, into their respective "DA Queues" (Bounced Fragments), while fragment T141G is directed into the appropriate "SA Address Reorder Queue". Likewise, the other blades (#2, #3, #4) queue their respective bounced & addressed fragments.

In step 530, the fragments T321R, & T431Y, are retagged to T321Y, & T431R, to reflect the transmission wavelengths used by blade #1. Similarly, retagging occurs for the transiting fragments in the other blades (#2, #3, #4).

The blade #1 "Inter-leaver" multiplexes fragments from T321Y with T213Y, and T431R with T214R, which share the same link (wavelength channel) to blades #3, & #4 respectively.

In step 540, the bounced fragments injected into the AWGr in step 530 emerge. Blade #1 receives 2 fragments, T142R, & T143Y, from neighboring blades, which are addressed to self.

The "DA Fragment Redirector" forwards the fragments into the "SA Fragment Reorder Queue (#4)". The "In Order Detection" stage upon detecting an "assembled" packet from SA #4, schedules the transmission of packet T4-out.

In step 550, untagged green arrows are shown to indicate the unutilized capacity (T/3) of the backplane. As can be appreciated, the shortest path link (0 hop) is under utilized.

For optimal performance for the above exemplary traffic case, a capacity of 2T/3 could be provided by a direct link (green light) to a "next" blade, while the remaining required capacity of T/3 would be provided by bounced fragments (×2), resulting in a backplane utilization capacity of 4T/3 versus 5T/3 per blade.

It can be shown, that the "best" backplane utilization capacity of T per blade can be achieved when the traffic scenario is an even distribution of traffic to all neighboring blades. Under this exemplary traffic scenario, only direct links are employed in the backplane, which results in no capacity usage due to bounced fragments.

Figure 6:
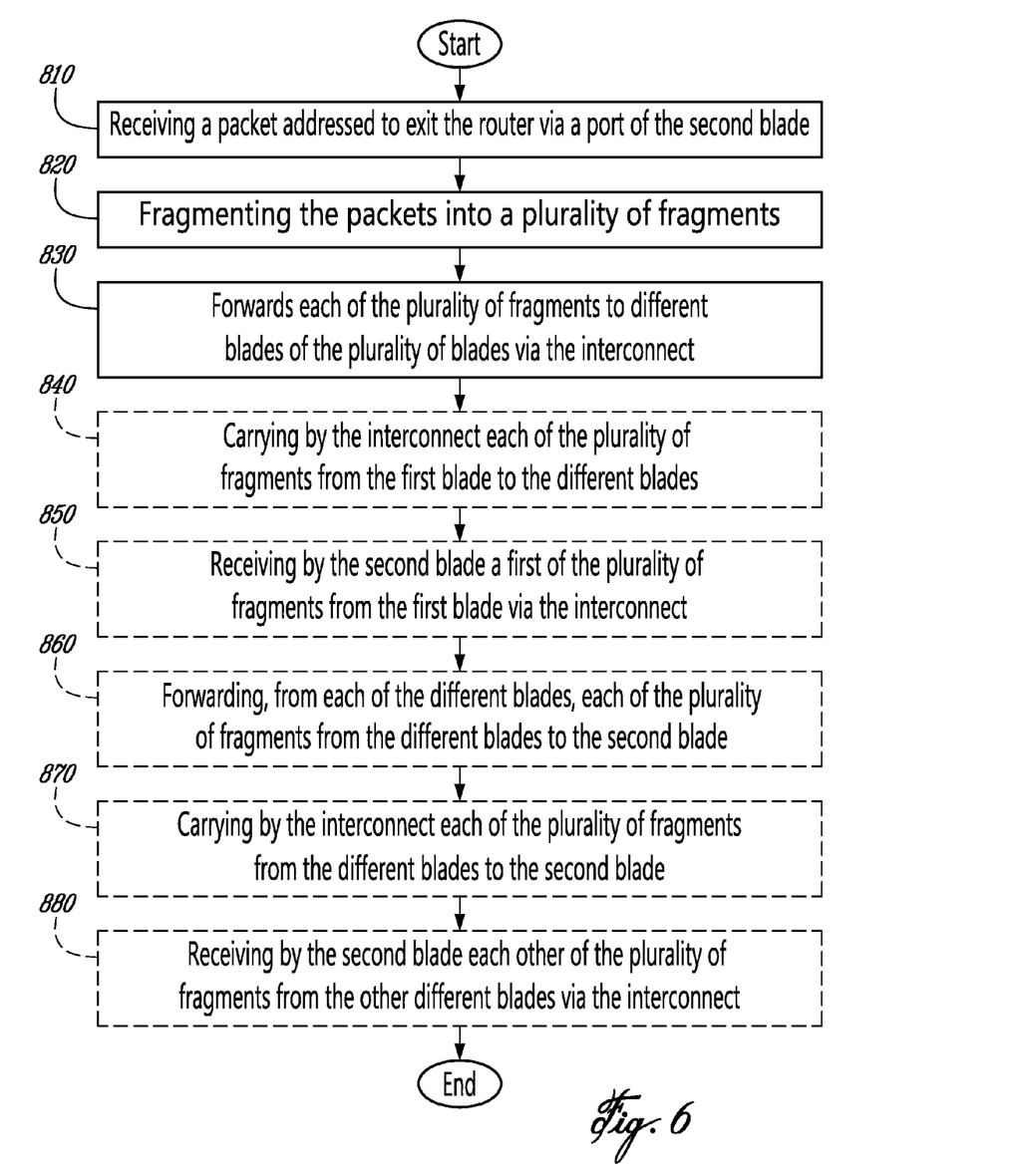
FIG. 6 is an exemplary flow chart of a method for forwarding a packet from a first blade of a router to a second blade of a router in accordance with the teachings of the present invention.

FIG. 6 shows an exemplary flow chart of a method for forwarding a packet from a first blade of a router to a second blade of a router in accordance with the teachings of the present invention. The router in the example of FIG. 6, comprises a plurality of blades, and an interconnect by which each of the plurality of blades can reach each other via channels. In the exemplary flow chart of FIG. 6, a first step is shown of receiving a packet on the port of the first blade (step 810). The packet received in step 810 by the routers is addressed to exit the router via the second blade. FIG. 6, further continues with a step of fragmenting the received packet into a plurality of fragments in the first blade (step 820). FIG. 6 thereafter follows with a step of forwarding each of the plurality of fragments from the first blade to different blades of the plurality of blades via the interconnect (step 830).

Optionally FIG. 6, further comprises a step of carrying by the interconnect each of the plurality of fragments from the first blade to the different blades (step 840). If the second blade is one of the different blades of step 840, the second blade receives a first of the plurality of fragments forwarded from the first blade via the interconnect (step 850). Thereafter each of the different blades (except the second blade if applicable) forwards each of the plurality of fragments directly to the second blade (step 860). The interconnect then carries each of the plurality of fragments from the different blades (except the second blade, if applicable) to the second blades (step 870). The second blade therefore receives each (other) of the plurality of fragments via the interconnect (step 880).

Although several aspects of the present invention have been illustrated in the accompanying Drawings and described in the foregoing Detailed Description, it will be understood that the invention is not limited to the disclosed aspects, but is capable of numerous rearrangements, modifications and substitutions without departing from the teachings of the invention.

What is claimed is:

1. A router having a plurality of blades comprising at least a first blade and a second blade wherein the router comprises:
   an interconnect providing a plurality of channels, wherein each of the plurality of channels is used between two of the plurality of blades, and wherein the interconnect is an optical interconnect by which a single wavelength from a single of the plurality of blades defines one of the plurality of channels and wherein each blade supports a plurality of wavelengths;
   wherein the first blade:
   receives a packet addressed to exit the router via the second blade;
   segments the packets into at least two fragments; and
   forwards the at least two fragments to at least two different blades of the plurality of blades, each of the at least two fragments being forwarded via one of the interconnect's channels
   the first blade forwards a first fragment of the at least two fragments directly to the second blade via the interconnect; and
   the first blade forwards another of the at least two fragments to a different blade, via the interconnect; and
   the interconnect further carries another of the at least two fragments from said different blade, to the second blade.

2. The router of claim 1 wherein the at least two different blades comprise each of the plurality of blades of the router, except the first blade.

3. The router of claim 1 wherein each of the plurality of channels is a dedicated channel between two of the plurality of blades.

4. The router of claim 1 wherein the packet is received on one of a plurality of ports of the first blade and is addressed to exit the router on one of a plurality of ports of the second blade.

5. A method of forwarding a packet from a first blade to a second blade of a router comprising a plurality of blades and an interconnect by which each of the plurality of blades can reach each other of the plurality of blades using a channel, the method comprising the steps of:
   receiving a packet at the first blade, the packet being addressed to exit the router via the second blade;
   fragmenting the packet into a at least two fragments at the first blade;
   forwarding the at least two fragments from the first blade to at least two different blades of the plurality of blades, each of the at least two fragments being forwarded via one of the interconnect's channels carrying by the interconnect each of the at least two fragments from the first blade to the at least two different blades, wherein one of the at least two different blades is the second blade;

forwarding, a first fragment of the at least two fragments directly to the second blade; and forwarding via the interconnect another of the at least two fragments, from a different blade, to the second blade and wherein the interconnect is an optical interconnect by which a single wavelength from a single of the plurality of blades defines one of the plurality of channels and wherein each blade supports a plurality of wavelengths.

* * * * *